No. 712,205. Patented Oct. 28, 1902.
H. A. POPPENHUSEN.
SPROCKET WHEEL.
(Application filed May 21, 1902.)
(No Model.)
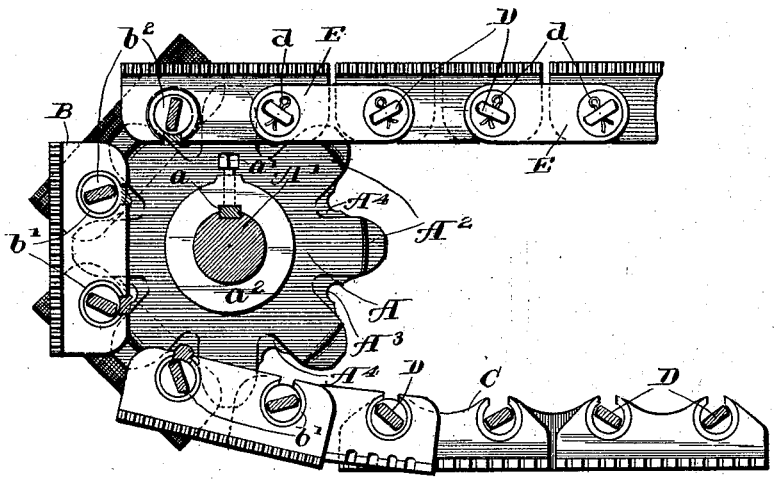
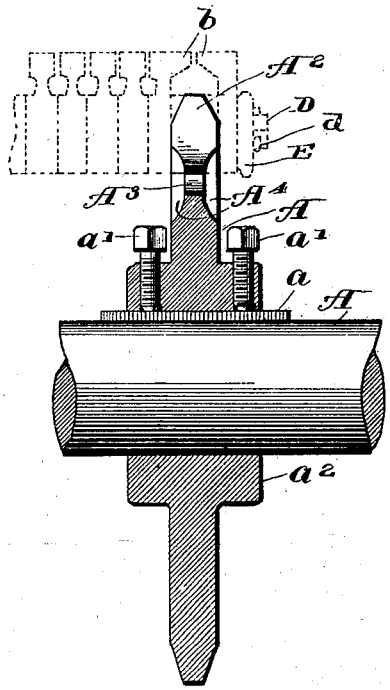
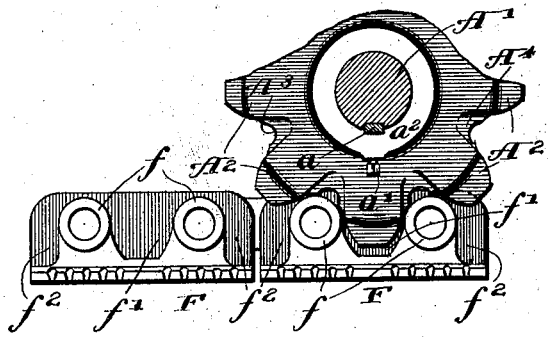
Witnesses:
Carl H. Crawford
William H. Hall
Inventor:
Herman A. Poppenhusen
by Poole & Brown
his Attorneys

UNITED STATES PATENT OFFICE.

HERMAN A. POPPENHUSEN, OF CHICAGO, ILLINOIS.

SPROCKET-WHEEL.

SPECIFICATION forming part of Letters Patent No. 712,205, dated October 28, 1902.

Application filed May 21, 1902. Serial No. 108,303. (No model.)

*To all whom it may concern:*

Be it known that I, HERMAN A. POPPENHUSEN, of Chicago, in the county of Cook and State of Illinois, have invented certain new and useful Improvements in Sprocket-Wheels; and I do hereby declare that the following is a full, clear, and exact description thereof, reference being had to the accompanying drawings, and to the letters of reference marked thereon, which form a part of this specification.

This invention relates to improvements in sprocket-wheels for driving or supporting chain belts associated with or forming parts of endless conveyers or the like or employed for transmitting power.

The main or principal object of said invention is to provide a sprocket-wheel of such construction as to prevent material which may collect or accumulate on the links of the chain belt from being caught or confined between the transverse parts of said links and the teeth of the sprocket-wheel or the parts of the wheel between the bases of the teeth thereof, with the result of forcing the chain-links outwardly away from the sprocket-wheel, and thereby bringing excessive strain upon the chain and the driving devices therefor.

The invention is herein shown as applied to sprocket-wheels for supporting and driving chain furnace-grates of that class embracing a traveling endless-belt grate by which the fuel is continuously fed forward or advanced through the furnace while combustion is taking place. In this use of the sprocket-wheel the construction is such as to prevent fine fuel or ashes which may drop on the driving link bars from being caught between the link bars and wheel, with the result of spreading the driving link bars outwardly away from the sprocket-wheel in the manner before stated. It is obvious, however, that my improved sprocket-wheel may be employed with equal advantage in connection with chain belts in general where liability of accumulation of extraneous and obstructive matter is likely to occur.

The invention consists in the matters hereinafter set forth, and more particularly pointed out in the appended claims.

In the drawings, Figure 1 is a fragmentary view of a traveling chain grate, showing one of the sprocket-wheels made in accordance with my invention, the shaft which supports it, and a portion of the chain belt. Fig. 2 is a section of the sprocket-wheel, showing in dotted lines the position of the wheel with respect to the driving-links of a chain grate. Fig. 3 is a partial side elevation of a sprocket-wheel, showing a chain grate having another form of driving-link.

As shown in said drawings, A designates one of the driving sprocket-wheels of a chain grate, of which there are a number and which when assembled in the complete machine are mounted on transverse supports, as the shaft A', which have bearing in the grate-frame, said wheel being affixed to the shaft by means of a spline $a$ and set-screws $a'$ $a'$, extending through the hub $a^2$ of the wheel and impinging on said spline.

The grate herein shown is of that kind illustrated and described in the prior United States Letters Patent to Green and Gent, No. 637,108, granted November 14, 1899. The movable part of said grate illustrated is formed of two kinds or sets of link bars B and C, the link bars B constituting the driving-links and the link bars C filling in between the driving-links and constituting the principal supporting-surface for the fuel, as shown in said prior patent. The several link bars are pivotally joined or connected by means of pivot bars or rods D in the same manner as shown in said prior patent. The said links are arranged side by side with their ends overlapping, so that each pivot-bar passes through the overlapping ends of the transverse series of link bars. The driving link bars B are arranged in overlapping pairs side by side and are provided at their upper margins with flanges $b$, upon the upper surfaces of which the fuel rests. Said flanges are arranged to extend toward each other on the overlapping ends of the link bars, so that the vertical parts or webs of the said bars are located at a distance apart to provide a space between the same of sufficient width to receive the teeth $A^2$ of the sprocket-wheels. The link bars B are provided with hubs $b'$, through which the pivot bars or rods extend, as indicated in Fig. 2, and said hubs are made of such length as to meet opposite the flanged edges of the bars, the hubs of the overlapping bars together forming the bearing-surfaces on the driving-link bars, which enter between the teeth of the sprocket-wheels and are engaged with said teeth in a manner to actuate the chain grate. The pivot-rods are prevented from rotating by means of short links E, which are provided with angular openings to receive the angular outer ends of the pivot rods or bars and are fastened in place by means of cotter-pins $d$ in the manner shown in Fig. 1.

I have found by experience that fine dust and ashes from the fuel resting on the upper lap of the chain grate sift downwardly between the links thereof and accumulate or lodge upon the upwardly-facing surfaces of the links in the lower lap of the chain and that the dust or ashes which collects on the hubs $b'$ of said lower link bars is liable to be confined or compressed between said hubs and the sprocket-wheels at the bases of the teeth $A^2$ thereof as said link bars come into engagement with the lower parts of the sprocket-wheels, said dust or ashes acting to depress or force the driving link bars away from and out of proper bearing engagement with the sprocket-wheels. This action of the interposed layer of dust on the link bars not only places great stress or strain on said driving-links and the driving mechanism therefor, but also requires more power to actuate the chain grate. The sprocket-wheel made in accordance with my invention is designed to eliminate this objectionable feature in prior constructions and to dislodge from the driving link bars any dust or ashes which may collect therein, so that the hubs of said link bars may have proper bearing engagement with the sprocket-wheels. For this purpose the peripheral parts of the sprocket-wheels are provided between each two sprocket-teeth $A^2$ and inside the surfaces of said wheels which engage the hubs of the drive-links with inwardly-extending notches $A^3$, which extend radially inwardly past the surfaces of the sprocket-wheel which have bearing upon the drive-link hubs. As herein shown, said notches $A^3$ are curved, and the radii of said notches are less than those of the curved bearing-surfaces of the adjacent teeth and the marginal parts of the wheel between them and that of the hubs which come into contact with the said curved bearing-surfaces, the radii of the notches being shorter than those of the hubs, so that the hubs are prevented from entering said notches $A^3$. In addition to the provision of the said notches the metal of the lateral faces of the wheel in its parts adjacent to the notches is cut away, as indicated at $A^4$, so as to decrease the thickness of the marginal part of the wheel around said notches and slightly outside of the same or in the region of the teeth-bases, thereby making the edges or margins of said wheel and the bases of the teeth thinner at these parts than in the main parts of the wheel and teeth.

The notches $A^3$, formed in the manner described, afford spaces or room for fuel dust or ashes which may accumulate on the hubs of the link bars, into which spaces said dust is forced when the link-bar hubs pass into engagement with the lower parts of the sprocket-wheels, thereby affording proper bearing engagement of the hubs of the link bars with the wheel. The dust forced into said notches in the manner described falls away from the wheels and chain to the space below the same. Should the accumulated layers of dust or ashes on said hubs be so great as to not be freed by the reception of a portion thereof by said notches, the thin edges or margins of the wheel at the bases of the teeth act to separate or cut away the layers of dust or ashes and to displace or dislodge the same from the hubs of the drive-links. This construction prevents the dust or ashes which may lodge on the hubs of the drive-link bars from being compressed between said hubs and the sprocket-wheels, and therefore obviates the forcing or spreading of the chain outwardly from the wheel and obviates also the consequent strain on the chain and wheels and driving connections therefor. In some instances the notch $A^3$ may be made sufficiently deep to obviate this objectionable feature without making the margins of the teeth and wheel thin at this point; but I prefer to employ the latter construction, as the same acts to effectually dislodge the dust and ashes from the chain-links and insures the proper bearing engagement of the links with the driving-wheels. The length of the teeth of the sprocket-wheels is such that they terminate short of the flanges $b$ of the drive-links, so as to prevent compression between said teeth and the link-flanges of the dust and ashes which may accumulate on the inner faces of the flanges in the lower lap of the chain. The points of said sprocket-teeth are also shown as tapered to provide more room for such dust or ashes in case there should be a large accumulation thereof on said flanges.

In Fig. 3 I have shown my improvements as applied to a grate having another form of drive link bars, wherein each drive link bar F is made of a single piece of metal and each is provided with two hubs $f f$, which engage the teeth $A^2$ of the sprocket-wheels A, and are cut away between said hubs to provide spaces $f'$ for the entrance of the sprocket-wheel teeth. Said link bars F are disposed in end-to-end relation, and the hubs $f$ thereof are so located with respect to the ends of the bars as to provide between the ends of adjacent bars spaces $f^2$ for the teeth of the sprocket-wheels. In other respects the construction illustrated in Fig. 3 is the same as that shown in Figs. 1 and 2, and the several portions of the sprocket-wheel bear like reference-letters in the drawings.

I claim as my invention—

1. A sprocket-wheel provided in the marginal bearing-surfaces between its teeth, with relieving-notches.

2. A sprocket-wheel provided between its teeth, inside the bearing-surfaces, with inwardly-directed notches, and being made thin in its parts adjacent to the margins of said notches.

3. The combination with a chain grate and a sprocket-wheel for driving the same, said grate embracing driving chain-links provided with hubs adapted for driving engagement with the sprocket-wheel teeth, of means for dislodging dust, ashes, or the like clinging to said hubs, as the chain-links pass into driving engagement with the lower part of the sprocket-wheel.

4. A traveling chain grate and a sprocket-wheel for driving the same, said chain grate embodying driving chain-links provided with hubs adapted for engagement with the teeth of the sprocket-wheel and said sprocket-wheel being provided in the marginal bearing-surfaces thereof between said teeth with relieving-notches.

5. A traveling chain grate and a sprocket-wheel for driving the same, said chain grate embodying driving chain-links provided with hubs adapted for engagement with the teeth of the sprocket-wheel and said sprocket-wheel being provided in the marginal bearing-surfaces thereof between said teeth with relieving-notches and being made thin in its parts adjacent to said notches.

In testimony that I claim the foregoing as my invention I affix my signature, in presence of two witnesses, this 12th day of May, A. D. 1902.

HERMAN A. POPPENHUSEN.

Witnesses:
WILLIAM L. HALL,
GERTRUDE BRYCE.